(12) United States Patent
Anderson (10) Patent No.: US 8,626,560 B1
(45) Date of Patent: Jan. 7, 2014

(54) SYSTEM AND METHOD FOR EVALUATING VEHICLE PURCHASE LOYALTY

(75) Inventor: Jeffrey P. Anderson, Bloomfield, MI (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 253 days.

(21) Appl. No.: 12/943,781

(22) Filed: Nov. 10, 2010

Related U.S. Application Data (63) Continuation of application No. 12/826,442, filed on Jun. 29, 2010, now abandoned.

(60) Provisional application No. 61/222,017, filed on Jun. 30, 2009.

(51) Int. Cl.
 *G06Q 10/00* (2012.01)
 *G06Q 30/00* (2012.01)

(52) U.S. Cl.
 USPC .................. 705/7.29; 705/7.31; 705/7.33

(58) Field of Classification Search
 USPC ................................... 705/7.11–7.42
 See application file for complete search history.

(56) References Cited

U.S. PATENT DOCUMENTS

| | | | |
|---|---|---|---|
| 4,775,935 A | 10/1988 | Yourick | |
| 4,827,508 A | 5/1989 | Shear | |
| 4,868,570 A | 9/1989 | Davis | |
| 4,872,113 A | 10/1989 | Dinerstein | |
| 4,935,870 A | 6/1990 | Burk, Jr. et al. | |
| 5,056,019 A | 10/1991 | Schultz et al. | |
| 5,120,704 A | 6/1992 | Lechter et al. | |
| 5,201,010 A | 4/1993 | Deaton et al. | |
| 5,216,612 A | 6/1993 | Cornett et al. | |
| 5,247,575 A | 9/1993 | Sprague et al. | |
| 5,325,509 A | 6/1994 | Lautzenheiser | |
| 5,341,429 A | 8/1994 | Stringer et al. | |
| 5,528,701 A | 6/1996 | Aref | |
| 5,555,409 A | 9/1996 | Leenstra, Sr. et al. | |
| 5,592,560 A | 1/1997 | Deaton et al. | |
| 5,630,070 A | 5/1997 | Dietrich et al. | |

(Continued)

FOREIGN PATENT DOCUMENTS

| | | |
|---|---|---|
| EP | 0 419 889 | 4/1991 |
| EP | 0 458 698 | 11/1991 |

(Continued)

OTHER PUBLICATIONS

"Auto Market Statistics" (2007) Experian (http://www.experian.com/assets/marketing-services/product-sheets/auto-market-statistics.pdf).*

(Continued)

*Primary Examiner* — Thomas L Mansfield, Jr.
*Assistant Examiner* — Sujay Koneru
(74) *Attorney, Agent, or Firm* — Knobbe Martens Olson & Bear LLP (57) ABSTRACT

One embodiment of the system and method described herein provides a vehicle loyalty system that gathers data on an individual's or a household's vehicles and analyzes purchase and disposal records within a particular time frame relative to the purchase date of each unique vehicle to determine brand and related loyalties. The system and method offer unique window definitions surrounding each purchase record such that data straddling a study time frame will still be caught and analyzed.

10 Claims, 4 Drawing Sheets

(56) References Cited

U.S. PATENT DOCUMENTS

| | | |
|---|---|---|
| 5,640,551 A | 6/1997 | Chu et al. |
| 5,655,129 A | 8/1997 | Ito |
| 5,659,731 A | 8/1997 | Gustafson |
| 5,666,528 A | 9/1997 | Thai |
| 5,737,732 A | 4/1998 | Gibson et al. |
| 5,754,938 A | 5/1998 | Herz et al. |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,822,410 A | 10/1998 | McCausland et al. |
| 5,822,750 A | 10/1998 | Jou et al. |
| 5,822,751 A | 10/1998 | Gray et al. |
| 5,835,915 A | 11/1998 | Carr et al. |
| 5,881,131 A | 3/1999 | Farris et al. |
| 5,884,287 A | 3/1999 | Edesess |
| 5,905,985 A | 5/1999 | Malloy et al. |
| 5,926,800 A | 7/1999 | Baronowski et al. |
| 5,963,932 A | 10/1999 | Jakobsson et al. |
| 5,974,396 A | 10/1999 | Anderson et al. |
| 6,009,415 A | 12/1999 | Shurling et al. |
| 6,018,723 A | 1/2000 | Siegel et al. |
| 6,044,357 A | 3/2000 | Garg |
| 6,064,990 A | 5/2000 | Goldsmith |
| 6,073,140 A | 6/2000 | Morgan et al. |
| 6,121,901 A | 9/2000 | Welch et al. |
| 6,128,624 A | 10/2000 | Papierniak et al. |
| 6,144,957 A | 11/2000 | Cohen et al. |
| 6,151,601 A | 11/2000 | Papierniak et al. |
| 6,182,048 B1 | 1/2001 | Osborn et al. |
| 6,182,060 B1 | 1/2001 | Hedgcock et al. |
| 6,208,979 B1 | 3/2001 | Sinclair |
| 6,223,171 B1 | 4/2001 | Chaudhuri et al. |
| 6,236,977 B1 | 5/2001 | Verba et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,304,869 B1 | 10/2001 | Moore et al. |
| 6,334,110 B1 | 12/2001 | Walter et al. |
| 6,339,769 B1 | 1/2002 | Cochrane et al. |
| 6,366,903 B1 | 4/2002 | Agrawal et al. |
| 6,456,979 B1 | 9/2002 | Flagg |
| 6,460,036 B1 | 10/2002 | Herz |
| 6,496,819 B1 | 12/2002 | Bello et al. |
| 6,513,018 B1 | 1/2003 | Culhane |
| 6,523,022 B1 | 2/2003 | Hobbs |
| 6,523,041 B1 | 2/2003 | Morgan et al. |
| 6,574,623 B1 | 6/2003 | Laung et al. |
| 6,598,030 B1 | 7/2003 | Siegel et al. |
| 6,631,496 B1 | 10/2003 | Li et al. |
| 6,651,220 B1 | 11/2003 | Penteroudakis et al. |
| 6,658,393 B1 | 12/2003 | Basch et al. |
| 6,738,748 B2 | 5/2004 | Wetzer |
| 6,766,327 B2 | 7/2004 | Morgan, Jr. et al. |
| 6,804,701 B2 | 10/2004 | Muret et al. |
| 6,959,281 B1 | 10/2005 | Freeling et al. |
| 6,983,478 B1 | 1/2006 | Grauch et al. |
| 7,003,504 B1 | 2/2006 | Angus et al. |
| 7,003,792 B1 | 2/2006 | Yuen |
| 7,028,052 B2 | 4/2006 | Chapman et al. |
| 7,039,607 B2 | 5/2006 | Watarai et al. |
| 7,047,251 B2 | 5/2006 | Reed et al. |
| 7,050,982 B2 | 5/2006 | Sheinson et al. |
| 7,082,435 B1 | 7/2006 | Guzman et al. |
| 7,092,898 B1 | 8/2006 | Mattick et al. |
| 7,136,448 B1 | 11/2006 | Venkataperumal et al. |
| 7,184,974 B2 | 2/2007 | Shishido |
| 7,185,016 B1 | 2/2007 | Rasmussen |
| 7,200,602 B2 | 4/2007 | Jonas |
| 7,240,059 B2 | 7/2007 | Bayliss et al. |
| 7,275,083 B1 | 9/2007 | Seibel et al. |
| 7,277,900 B1 | 10/2007 | Ganesh et al. |
| 7,296,734 B2 | 11/2007 | Pliha |
| 7,366,694 B2 | 4/2008 | Lazerson |
| 7,370,044 B2 | 5/2008 | Mulhern et al. |
| 7,376,603 B1 | 5/2008 | Mayr et al. |
| 7,383,227 B2 | 6/2008 | Weinflash et al. |
| 7,403,942 B1 | 7/2008 | Bayliss |
| 7,467,127 B1 | 12/2008 | Baccash et al. |
| 7,472,088 B2 | 12/2008 | Taylor et al. |
| 7,536,346 B2 | 5/2009 | Aliffi et al. |
| 7,571,139 B1 | 8/2009 | Giordano et al. |
| 7,580,856 B1 | 8/2009 | Pliha |
| 7,590,589 B2 | 9/2009 | Hoffberg |
| 7,596,512 B1 | 9/2009 | Raines et al. |
| 7,610,257 B1 | 10/2009 | Abrahams |
| 7,653,592 B1 | 1/2010 | Flaxman et al. |
| 7,653,593 B2 | 1/2010 | Zarikian et al. |
| 7,668,840 B2 | 2/2010 | Bayliss et al. |
| 7,672,865 B2 | 3/2010 | Kumar et al. |
| 7,698,163 B2 | 4/2010 | Reed et al. |
| 7,707,059 B2 | 4/2010 | Reed et al. |
| 7,725,300 B2 | 5/2010 | Pinto et al. |
| 7,742,982 B2 | 6/2010 | Chaudhuri et al. |
| 7,747,480 B1 | 6/2010 | Agresta et al. |
| 7,954,698 B1 | 6/2011 | Pliha |
| 7,962,404 B1 | 6/2011 | Metzger, II et al. |
| 7,991,666 B2 | 8/2011 | Haggerty et al. |
| 7,991,689 B1 | 8/2011 | Brunzell et al. |
| 8,001,042 B1 | 8/2011 | Brunzell et al. |
| 8,005,759 B2 | 8/2011 | Hirtenstein et al. |
| 8,024,264 B2 | 9/2011 | Chaudhuri et al. |
| 8,065,233 B2 | 11/2011 | Lee et al. |
| 8,078,528 B1 | 12/2011 | Vicente et al. |
| 8,219,464 B2 * | 7/2012 | Inghelbrecht et al. ........ 705/27.1 |
| 8,234,498 B2 | 7/2012 | Britti et al. |
| 8,271,378 B2 | 9/2012 | Chaudhuri et al. |
| 8,301,574 B2 | 10/2012 | Kilger et al. |
| 8,364,588 B2 | 1/2013 | Celka et al. |
| 8,392,334 B2 | 3/2013 | Hirtenstein et al. |
| 2001/0037332 A1 | 11/2001 | Miller et al. |
| 2001/0049620 A1 | 12/2001 | Blasko |
| 2002/0023051 A1 | 2/2002 | Kunzle et al. |
| 2002/0072964 A1 | 6/2002 | Choi |
| 2002/0077964 A1 | 6/2002 | Brody et al. |
| 2002/0099628 A1 | 7/2002 | Yakaoka et al. |
| 2002/0128960 A1 | 9/2002 | Lambiotte et al. |
| 2002/0138297 A1 | 9/2002 | Lee |
| 2002/0173984 A1 | 11/2002 | Robertson et al. |
| 2002/0184255 A1 | 12/2002 | Edd et al. |
| 2002/0194103 A1 | 12/2002 | Nabe |
| 2003/0018549 A1 | 1/2003 | Fei et al. |
| 2003/0033242 A1 | 2/2003 | Lynch et al. |
| 2003/0036996 A1 | 2/2003 | Lazerson |
| 2003/0097380 A1 | 5/2003 | Mulhern et al. |
| 2003/0105728 A1 | 6/2003 | Yano et al. |
| 2003/0171942 A1 | 9/2003 | Gaito |
| 2003/0200151 A1 | 10/2003 | Ellenson et al. |
| 2003/0212654 A1 | 11/2003 | Harper et al. |
| 2003/0216965 A1 | 11/2003 | Libman |
| 2003/0233323 A1 | 12/2003 | Bilski et al. |
| 2004/0030649 A1 | 2/2004 | Nelson et al. |
| 2004/0107125 A1 | 6/2004 | Guheen et al. |
| 2004/0122735 A1 | 6/2004 | Meshkin |
| 2004/0128150 A1 | 7/2004 | Lundegren |
| 2004/0128230 A1 | 7/2004 | Oppenheimer et al. |
| 2004/0153448 A1 | 8/2004 | Cheng et al. |
| 2004/0163101 A1 | 8/2004 | Swix |
| 2004/0205157 A1 | 10/2004 | Bibelnieks et al. |
| 2004/0220896 A1 | 11/2004 | Finlay et al. |
| 2004/0225596 A1 | 11/2004 | Kemper et al. |
| 2004/0243588 A1 | 12/2004 | Tanner et al. |
| 2005/0004805 A1 | 1/2005 | Srinivasan |
| 2005/0027633 A1 | 2/2005 | Fortuna et al. |
| 2005/0154664 A1 | 7/2005 | Guy et al. |
| 2005/0197954 A1 | 9/2005 | Maitland et al. |
| 2005/0209922 A1 | 9/2005 | Hofmeister |
| 2005/0251820 A1 | 11/2005 | Stefanik et al. |
| 2005/0256780 A1 * | 11/2005 | Eldred ............ 705/26 |
| 2005/0267774 A1 * | 12/2005 | Merritt et al. ............ 705/1 |
| 2005/0288954 A1 | 12/2005 | McCarthy et al. |
| 2006/0004731 A1 | 1/2006 | Seibel et al. |

(56) References Cited

U.S. PATENT DOCUMENTS

| | | |
|---|---|---|
| 2006/0041443 A1 | 2/2006 | Horvath |
| 2006/0242039 A1 | 10/2006 | Haggerty et al. |
| 2006/0242046 A1 | 10/2006 | Haggerty et al. |
| 2006/0242048 A1 | 10/2006 | Haggerty et al. |
| 2006/0242050 A1 | 10/2006 | Haggerty et al. |
| 2006/0293921 A1 | 12/2006 | McCarthy et al. |
| 2007/0011039 A1 | 1/2007 | Oddo |
| 2007/0156515 A1* | 7/2007 | Hasselback et al. ............ 705/14 |
| 2007/0168246 A1 | 7/2007 | Haggerty et al. |
| 2007/0179798 A1 | 8/2007 | Inbarajan |
| 2007/0179860 A1* | 8/2007 | Romero ........................ 705/26 |
| 2007/0192165 A1 | 8/2007 | Haggerty et al. |
| 2007/0226093 A1 | 9/2007 | Chan et al. |
| 2007/0226130 A1 | 9/2007 | Haggerty et al. |
| 2007/0244732 A1 | 10/2007 | Chatterji et al. |
| 2007/0250327 A1* | 10/2007 | Hedy ............................. 705/1 |
| 2007/0288271 A1 | 12/2007 | Klinkhammer |
| 2007/0288360 A1 | 12/2007 | Seeklus |
| 2008/0059317 A1 | 3/2008 | Chandran et al. |
| 2008/0120155 A1 | 5/2008 | Pliha |
| 2008/0221970 A1 | 9/2008 | Megdal et al. |
| 2008/0221990 A1 | 9/2008 | Megdal et al. |
| 2008/0228556 A1 | 9/2008 | Megdal et al. |
| 2008/0228635 A1 | 9/2008 | Megdal et al. |
| 2008/0255897 A1 | 10/2008 | Megdal et al. |
| 2008/0294540 A1 | 11/2008 | Celka et al. |
| 2008/0301016 A1 | 12/2008 | Durvasula et al. |
| 2008/0312969 A1 | 12/2008 | Raines et al. |
| 2009/0018996 A1* | 1/2009 | Hunt et al. ...................... 707/2 |
| 2009/0026255 A1* | 1/2009 | Besecker et al. ............. 235/375 |
| 2009/0043637 A1 | 2/2009 | Eder |
| 2009/0076883 A1 | 3/2009 | Kilger et al. |
| 2009/0144201 A1* | 6/2009 | Gierkink et al. ................ 705/64 |
| 2010/0145847 A1 | 6/2010 | Zarikian et al. |
| 2010/0198629 A1* | 8/2010 | Weisleder et al. ............... 705/7 |
| 2010/0332292 A1 | 12/2010 | Anderson |
| 2011/0071950 A1 | 3/2011 | Ivanovic |
| 2011/0145122 A1 | 6/2011 | Haggerty et al. |
| 2011/0184838 A1 | 7/2011 | Winters et al. |
| 2011/0213641 A1 | 9/2011 | Metzger, II et al. |
| 2011/0251946 A1 | 10/2011 | Haggerty et al. |
| 2012/0047219 A1 | 2/2012 | Feng et al. |
| 2012/0158574 A1 | 6/2012 | Brunzell et al. |

FOREIGN PATENT DOCUMENTS

| | | |
|---|---|---|
| EP | 0 559 358 | 9/1993 |
| EP | 0 977 128 | 2/2000 |
| EP | 1 122 664 | 8/2001 |
| EP | 0 772 836 | 12/2001 |
| JP | 09-251486 | 9/1997 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-063995 | 11/2000 |
| KR | 10-2001-0016349 | 3/2001 |
| KR | 10-2001-0035145 | 5/2001 |
| KR | 10-2002-0007132 | 1/2002 |
| WO | WO 95/34155 | 12/1995 |
| WO | WO 96/00945 | 1/1996 |
| WO | WO 97/23838 | 7/1997 |
| WO | WO 98/41931 | 9/1998 |
| WO | WO 98/41932 | 9/1998 |
| WO | WO 98/41933 | 9/1998 |
| WO | WO 99/04350 | 1/1999 |
| WO | WO 99/17225 | 4/1999 |
| WO | WO 99/17226 | 4/1999 |
| WO | WO 99/22328 | 5/1999 |
| WO | WO 01/75754 | 10/2001 |
| WO | WO 03/101123 | 12/2003 |
| WO | WO 2007/149941 | 12/2007 |

OTHER PUBLICATIONS

"Japan's JAAI system appraises used cars over internet", Asia Pulse Mar. 3, 2000.

"WashingtonPost.com and Cars.com launch comprehensive automotive web site for the Washington area". PR Newswire, Oct. 22, 1998.

Miller, "NADA used-car prices go online". Automotive News, Jun. 14, 1999 p. 36.

Sawyers, "NADA to offer residual guide". Automotive News, May 22, 2000 p. 3.

U.S. Appl. No. 12/705,489, filed Feb. 12, 2010, Bargoli et al.

U.S. Appl. No. 12/705,511, filed Feb. 12, 2010, Bargoli et al.

"AutoConnect Partners with Organic to Build World's Most Comprehensive Online Emporium of Pre-Owned Vehicles", PR Newswire, May 19, 1998, 2 pages.

Caliendo, et al., "Some Practical Guidance for the Implementation of Propensity Score Matching"; IZA:Discussion Paper Series; No. 1588; Germany; May 2005.

"Carfax Teams with Esurance", PR Newswire, May 14, 2001, 1 Page.

Cohen et al., "Optimizer: IBM's Multi Echelon Inventory System for Managing Service Logistics", Interfaces, vol. 20, pp. 65-82, Jan.-Feb. 1990.

"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003.

"Driveitaway.com Links with AutoCheck to Provide Car Shoppers Vehicle Histories", PR Newswire, Jan. 15, 2001, 1 Page.

Elmasri et al., "Fundamentals of Database Systems, Third Edition (Excerpts)", Jun. 2000, pp. 253, 261, 268-70, 278-80, 585, 595.

Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.

Handfield, Robert B. et al., "Managing Component Life Cycles in Dynamic Technological Environments", International Journal of Purchasing and Materials Management, Tempe, vol. 30, Iss. 2, p. 20, 9 pgs., Spring 1994, ProQuest ID 590096.

Haughton, Dominique et al.; Direct Marketing Modeling with Cart and Chaid, Journal of Direct Marketing, Fall 1997, vol. 11, No. 4, pp. 42-52.

Inderfurth et al., "Decision Support for Spare Parts Acquisition in Post Product Life Cycle", Central European Journal of Operations Research, vol. 16, pp. 17-42, 2008 [Initially published online Dec. 21, 2007].

"Intelligent Miner Applications Guide", IBM Corp., Apr. 2, 1999, Chapters 4-7, pp. 33-132.

Käki, Anssi, "Forecasting in End-Of-Life Spare Parts Procurement", Master's Thesis—Helsinki University of Technology System Analysis Laboratory, Jul. 27, 2007.

Kim, Bowon et al., Optimal Pricing, EOL (End of Life) Warranty, and Spare, Parts Manufacturing Strategy Amid Product Transition, European Journal of Operation Research, vol. 188, pp. 723-745, 2008 [Initially published online May 1, 2007].

Klein, et al., "A Constant-Utility Index of the Cost of Living", The Review of Economic Studies, pp. 84-87, vol. XV-XVI, Kraus Reprint Corporation, New York, 1960.

Klein, et al., "An Econometric Model of the United States: 1929-1952", Amsterdam: North-Holland, 1955.

Klein, L.R; "The Keynesian Revolution", New York: MacMillan, 1947.

Koller, Mike, "Wireless Service Aids," InternetWeek; Jul. 9, 2001, p. 15, 1 Page.

Krupp, James A.G.; "Forecasting for the Automotive Aftermarket"; The Journal of Business Forecasting Methods & Systems; Winter 1993-1994; 12, 4; ABI/Inform Global; pp. 8-12.

(56) References Cited

OTHER PUBLICATIONS

Lapide, Larry, "New Developments in Business Forecasting", The Journal of Business Forecasting, pp. 12-14, Spring 2002.

Lee, Ho Geun, "AUCNET: Electronic Intermediary for Used-Car Transactions", EM-Electronic Markets, vol. 7, No. 4, Dec. 1997, pp. 24-28.

Moore, John R., Jr. "Forecasting and Scheduling for Past-Model Replacement Parts" Management Science, Application Series, vol. 18, No. 4, Part 1, Dec. 1971, pp. B200-B213.

Packer, A. H., "Simulation and Adaptive Forecasting an Applied to Inventory Control", Operations Research, vol. 15, No. 4, pp. 660-679, Jul. 1965.

Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.

Porter, G. Zell, "An Economic Method for Evaluating Electronic Component Obsolescence Solutions", Retrieved from the web at www.gidep.org/data/dmsms/library/zell.pdf, May 1998, pp. 1-9.

Roos, Gina, "Web-Based Service Helps OEMs Cure Parts Obsolescence Blues", Electronic Engineering Times, p. 86, Oct. 8, 2001, Dialog 09056737 78968668.

Santarini, Michael, "Forecasts the Probably Obsolescence of Components—Module Predicts Parts Life", Electronic Engineering Times, Jan. 11, 1999, p. 48(1), Dialog 0607160353548246.

Schmittlein et al., "Customer Base Analysis: An Industrial Purchase Process Application", Marketing Science, vol. 13, No. 1 (Winter 1994), p. 41-67.

ServiceObjects, "DOTS Web Services—Product Directory", downloaded from htto://www.serviceobjects.com/products/directory_of_web services.asp, 4 pages, Aug. 17, 2006.

Smith, Wendell R., "Product Differentiation and Market Segmentation as Alternative Marketing Strategies", The Journal of Marketing, pp. 3-8, vol. XXI, the American Marketing Association, Brattleboro, Vermont, Jul. 1956.

Stone, "Linear Expenditure Systems and Demand Analysis: An Application to the Pattern of British Demand", The Economic Journal: The Journal of the Royal Economic Society, pp. 511-527, vol. LXIV, Macmillan & Co., London, Sep. 1954.

"Stoneage Corporation Announces Database of 250,000 Used Cars Posted to the Internet", PR Newswire, Feb. 24, 1998, 1 Page.

Sullivan, Laurie, "Obsolete-Parts Program Thriving", EBN, Manhasset, Issue 1296, p. 26, Jan. 2002, ProQuest 10 101195090.

Tao, Lixin, "Shifting Paradigms with the Application Service Provider Model"; Concordia University, Canada; IEEE; Oct. 2001.

Thoemmes, Felix, "Propensity Score Matching in SPSS", Center for Educational Science and Psychology, University of Tübingen, Jan. 2012.

"Web Sites Let Automotive Consumers Arm Themselves with Price Information", Orange County Register, Nov. 14, 1997, 3 Pages.

Webster, Lee R., "Failure Rates & Life Cycle Costs", Consulting-Specifying Engineer; 23, 4; ABI/INFORM Global, Apr. 1998, p. 42.

Working, Holbrook, "Statistical Laws of Family Expenditure", Journal of the American Statistical Association, pp. 43-56, vol. 38, American Statistical Association, Washington, D.C., Mar. 1943.

"Yahoo! Autos Provides Enhanced Road Map for Researching, Buying and Selling Cars Online", PR Newswire, Oct. 13, 1998, 2 Pages.

* cited by examiner

| Purchased_Corporate | Purchased_Brand | ASTON MARTIN LAGONDA LTD / Aston Martin | | FORD / Ford | | Owned_Corporate/Brand FORD / Lincoln | | VOLKSWAGEN / Volkswagen | | VOLVO / Volvo | |
|---|---|---|---|---|---|---|---|---|---|---|---|
| | | Count | % Of All Owned Brand | Count | % Of All Owned Brand | Count | % Of All Owned Brand | Count | % Of All Owned Brand | Count | % Of All Owned Brand |
| ASTON MARTIN LAGONDA LTD | Aston Martin | 21 | 4.50% | 12 | 0.00% | 1 | 0.00% | 5 | 0.01% | 7 | 0.04% |
| AUTOMOBILI LAMBORGHINI S.P.A. | Lamborghini | 2 | 0.43% | 6 | 0.00% | | 0.00% | 1 | 0.00% | | |
| BMW | BMW | 53 | 11.35% | 3,274 | 1.10% | 475 | 2.17% | 1,739 | 3.68% | 1,090 | 5.58% |
| BMW | Mini | 6 | 1.28% | 726 | 0.24% | 36 | 0.16% | 505 | 1.07% | 170 | 0.87% |
| CHRYSLER LLC | Chrysler | 1 | 0.21% | 1,973 | 0.66% | 158 | 0.72% | 175 | 0.37% | 61 | 0.31% |
| CHRYSLER LLC | Dodge | 6 | 1.28% | 7,237 | 2.44% | 349 | 1.59% | 652 | 1.38% | 154 | 0.79% |
| CHRYSLER LLC | Jeep | 10 | 2.14% | 4,760 | 1.60% | 293 | 1.34% | 808 | 1.71% | 314 | 1.61% |
| DAIMLER AG | Maybach | | | | | | | | | | |
| DAIMLER AG | Mercedes-Benz | 75 | 16.06% | 3,985 | 1.34% | 761 | 3.47% | 1,519 | 3.21% | 1,163 | 5.95% |
| DAIMLER AG | Smart | | | 161 | 0.05% | 3 | 0.01% | 50 | 0.11% | 11 | 0.06% |
| FERRARI | Ferrari | 4 | 0.86% | 15 | 0.01% | 2 | 0.01% | 1 | 0.00% | 1 | 0.01% |
| FORD | Ford | 24 | 5.14% | 135,511 | 45.64% | 4,642 | 21.20% | 3,371 | 7.13% | 1,410 | 7.22% |
| FORD | Lincoln | 2 | 0.43% | 4,991 | 1.68% | 5,793 | 26.45% | 234 | 0.49% | 246 | 1.26% |
| FORD | Mercury | | | 4,473 | 1.51% | 995 | 4.54% | 165 | 0.35% | 80 | 0.41% |
| GM | Buick | 2 | 0.43% | 2,806 | 0.94% | 420 | 1.92% | 336 | 0.71% | 203 | 1.04% |
| GM | Cadillac | 18 | 3.85% | 3,210 | 1.08% | 727 | 3.32% | 424 | 0.90% | 274 | 1.40% |
| GM | Chevrolet | 16 | 3.43% | 25,085 | 8.45% | 1,332 | 6.08% | 2,716 | 5.74% | 817 | 4.18% |
| GM | GMC | 7 | 1.50% | 7,098 | 2.39% | 476 | 2.17% | 894 | 1.89% | 460 | 2.35% |
| GM | Hummer | 2 | 0.43% | 129 | 0.04% | 11 | 0.05% | 20 | 0.04% | 9 | 0.05% |
| GM | Pontiac | 1 | 0.21% | 1,144 | 0.39% | 63 | 0.29% | 120 | 0.25% | 21 | 0.11% |
| GM | Saab | 1 | 0.21% | 127 | 0.04% | 16 | 0.07% | 76 | 0.16% | 56 | 0.29% |
| GM | Saturn | | | 901 | 0.30% | 42 | 0.19% | 135 | 0.29% | 21 | 0.11% |
| HONDA | Acura | 5 | 1.07% | 1,579 | 0.53% | 158 | 0.72% | 668 | 1.41% | 486 | 2.49% |
| HONDA | Honda | 10 | 2.14% | 17,280 | 5.82% | 836 | 3.82% | 4,670 | 9.87% | 1,810 | 9.27% |
| HYUNDAI | Hyundai | 1 | 0.21% | 6,050 | 2.04% | 341 | 1.56% | 953 | 2.02% | 285 | 1.45% |
| HYUNDAI | Kia | | | 4,054 | 1.37% | 127 | 0.58% | 490 | 1.04% | 84 | 0.43% |
| ISUZU | Isuzu | | | 1 | 0.00% | | 0.00% | | | | |
| JAGUAR | Jaguar | 7 | 1.50% | 187 | 0.06% | 60 | 0.27% | 67 | 0.14% | 50 | 0.26% |
| LAND ROVER | Land Rover | 49 | 10.49% | 546 | 0.18% | 114 | 0.52% | 158 | 0.33% | 116 | 0.59% |
| LOTUS CARS LTD | Lotus | | | 3 | 0.00% | | 0.00% | 2 | 0.00% | | |
| MAZDA | Mazda | 2 | 0.43% | 4,370 | 1.47% | 256 | 1.17% | 1,188 | 2.51% | 411 | 2.10% |
| MITSUBISHI | Mitsubishi | 1 | 0.21% | 680 | 0.23% | 32 | 0.15% | 116 | 0.25% | 32 | 0.15% |
| NISSAN | Infiniti | 8 | 1.71% | 1,529 | 0.51% | 224 | 1.02% | 493 | 1.04% | 354 | 1.81% |
| NISSAN | Nissan | 7 | 1.50% | 10,002 | 3.37% | 583 | 2.66% | 1,949 | 4.12% | 590 | 3.02% |
| OFFICINE ALFIERI MASERATI SPA | Maserati | 7 | 1.50% | 16 | 0.01% | 3 | 0.01% | 5 | 0.01% | 7 | 0.04% |
| PORSCHE | Porsche | 34 | 7.28% | 344 | 0.12% | 49 | 0.22% | 180 | 0.38% | 99 | 0.51% |
| ROLLS ROYCE MOTOR CAR LIMITED | Bentley | 8 | 1.71% | 15 | 0.01% | 4 | 0.02% | 4 | 0.01% | 1 | 0.01% |
| ROLLS ROYCE MOTOR CAR LIMITED | Rolls Royce | | | 1 | 0.00% | 2 | 0.01% | | | 1 | 0.01% |
| SUBARU | Subaru | 4 | 0.86% | 4,486 | 1.51% | 171 | 0.78% | 1,800 | 3.81% | 786 | 4.02% |
| SUZUKI | Suzuki | | | 498 | 0.17% | 14 | 0.06% | 77 | 0.16% | 12 | 0.06% |
| TESLA MOTORS | Tesla | 1 | 0.21% | 13 | 0.00% | 3 | 0.01% | 2 | 0.00% | 3 | 0.02% |
| TOYOTA | Lexus | 17 | 3.64% | 3,528 | 1.19% | 560 | 2.56% | 1,156 | 2.44% | 1,022 | 5.23% |
| TOYOTA | Scion | 1 | 0.21% | 872 | 0.29% | 27 | 0.12% | 217 | 0.46% | 40 | 0.20% |
| TOYOTA | Toyota | 18 | 3.85% | 26,614 | 8.96% | 1,203 | 5.49% | 5,515 | 11.66% | 2,483 | 12.71% |
| VOLKSWAGEN | Audi | 26 | 5.57% | 1,384 | 0.47% | 169 | 0.77% | 1,343 | 2.84% | 772 | 3.95% |
| VOLKSWAGEN | Volkswagen | 7 | 1.50% | 4,302 | 1.45% | 273 | 1.25% | 11,894 | 25.15% | 866 | 4.43% |
| VOLVO | Volvo | 3 | 0.64% | 955 | 0.32% | 96 | 0.44% | 400 | 0.85% | 2,657 | 13.60% |
| Total | | 467 | 100.00% | 296,943 | 100.00% | 21,901 | 100.00% | 47,293 | 100.00% | 19,535 | 100.00% |

| Owned Corporate | Owned Brand | 2009 Q4 Number of Vehicles Purchased | 2009 Q4 Brand Loyalty Percentage |
|---|---|---|---|
| ASTON MARTIN LAGONDA LTD | Aston Martin | 467 | 4.50% |
| ASTON MARTIN LAGONDA LTD | Total | 467 | 4.50% |
| AUTOMOBILI LAMBORGHINI S.P.A. | Lamborghini | 179 | 6.70% |
| AUTOMOBILI LAMBORGHINI S.P.A. | Total | 179 | 6.70% |
| BMW | BMW | 59,195 | 32.02% |
| BMW | Mini | 7,271 | 13.79% |
| BMW | Total | 66,466 | 30.02% ← 401 |
| CHRYSLER LLC | Chrysler | 50,937 | 11.84% |
| CHRYSLER LLC | Dodge | 114,664 | 19.98% |
| CHRYSLER LLC | Dodge Freightliner | 41 | 0.00% |
| CHRYSLER LLC | Eagle | 251 | 0.00% |
| CHRYSLER LLC | Jeep | 64,491 | 15.84% |
| CHRYSLER LLC | Plymouth | 4,525 | 0.00% |
| CHRYSLER LLC | Total | 234,909 | 16.67% |
| DAIMLER AG | Maybach | 45 | 6.67% |
| DAIMLER AG | Mercedes-Benz | 59,922 | 39.65% |
| DAIMLER AG | Smart | 1,144 | 9.79% |
| DAIMLER AG | Total | 61,111 | 39.07% |
| FERRARI | Ferrari | 477 | 2.94% |
| FERRARI | Total | 477 | 2.94% |
| FORD | Ford | 296,943 | 45.64% |
| FORD | Lincoln | 21,901 | 26.45% |
| FORD | Mercury | 26,853 | 16.55% |
| FORD | Total | 345,697 | 42.16% |
| GM | Buick | 34,900 | 23.86% |
| GM | Cadillac | 34,929 | 26.81% |
| GM | Chevrolet | 296,096 | 43.42% |
| GM | Geo | 1,417 | 0.00% |
| GM | GMC | 79,360 | 24.03% |
| GM | Hummer | 6,607 | 2.62% |
| GM | Oldsmobile | 9,009 | 0.00% |
| GM | Pontiac | 43,368 | 6.31% |
| GM | Saab | 6,521 | 8.86% |
| GM | Saturn | 33,684 | 13.55% ← 402 |
| GM | Total | 545,891 | 31.76% |
| HONDA | Acura | 36,659 | 21.21% |
| HONDA | Honda | 226,819 | 42.37% |
| HONDA | Total | 263,478 | 39.42% |
| HYUNDAI | Hyundai | 47,820 | 34.96% |
| HYUNDAI | Kia | 20,835 | 33.18% |
| HYUNDAI | Total | 68,655 | 34.42% |
| ISUZU | Isuzu | 3,826 | 0.00% |
| ISUZU | Total | 3,826 | 0.00% |
| JAGUAR | Jaguar | 4,213 | 7.74% |
| JAGUAR | Total | 4,213 | 7.74% |
| LAND ROVER | Land Rover | 8,197 | 20.65% |
| LAND ROVER | Total | 8,197 | 20.65% |
| LOTUS CARS LTD | Lotus | 160 | 1.25% |
| LOTUS CARS LTD | Total | 160 | 1.25% |
| MAZDA | Mazda | 41,124 | 18.76% |
| MAZDA | Total | 41,124 | 18.76% |
| MITSUBISHI | Mitsubishi | 16,424 | 12.72% |
| MITSUBISHI | Total | 16,424 | 12.72% |
| NISSAN | Datsun | 45 | 0.00% |
| NISSAN | Infiniti | 20,760 | 17.90% |
| NISSAN | Nissan | 115,571 | 31.64% |
| NISSAN | Total | 136,376 | 29.54% |
| OFFICINE ALFIERI MASERATI SPA | Maserati | 575 | 4.35% |
| OFFICINE ALFIERI MASERATI SPA | Total | 575 | 4.35% |
| PORSCHE | Porsche | 9,378 | 13.80% |
| PORSCHE | Total | 9,378 | 13.80% |
| ROLLS ROYCE MOTOR CAR LIMITED | Bentley | 945 | 8.99% |
| ROLLS ROYCE MOTOR CAR LIMITED | Rolls Royce | 115 | 7.83% |
| ROLLS ROYCE MOTOR CAR LIMITED | Total | 1,060 | 8.87% |
| SUBARU | Subaru | 32,744 | 41.34% |
| SUBARU | Total | 32,744 | 41.34% |
| SUZUKI | Suzuki | 6,277 | 13.56% |
| SUZUKI | Total | 6,277 | 13.56% |
| TESLA MOTORS | Tesla | 47 | 8.51% |
| TESLA MOTORS | Total | 47 | 8.51% |
| TOYOTA | Lexus | 66,106 | 32.18% |
| TOYOTA | Scion | 11,769 | 8.17% |
| TOYOTA | Toyota | 298,853 | 47.51% ← 403 |
| TOYOTA | Total | 376,728 | 43.59% |
| VOLKSWAGEN | Audi | 19,104 | 23.97% |
| VOLKSWAGEN | Volkswagen | 47,293 | 25.15% |
| VOLKSWAGEN | Total | 66,397 | 24.81% |
| VOLVO | Volvo | 19,535 | 13.60% |
| VOLVO | Total | 19,535 | 13.60% |

SYSTEM AND METHOD FOR EVALUATING VEHICLE PURCHASE LOYALTY

CROSS-REFERENCE TO RELATED APPLICATIONS

This application is a continuation of U.S. application Ser. No. 12/826,442, filed Jun. 29, 2010 and titled SYSTEM AND METHOD FOR EVALUATING VEHICLE PURCHASE LOYALTY, which claims priority to U.S. Provisional Application No. 61/222,017, filed on Jun. 30, 2009, titled SYSTEM AND METHOD FOR EVALUATING VEHICLE PURCHASE LOYALTY, the disclosure of both of which are hereby incorporated by reference in their entirety into this application.

BACKGROUND

1. Field of the Disclosure

This disclosure relates generally to automated vehicle analysis systems and methods for analyzing loyalty behaviors of vehicle purchasers and disposers when returning to market to purchase a new vehicle and for evaluating customer loyalty.

2. Description of the Related Art

Buying an automobile or other vehicle is often a difficult proposition for many people. It is typically one of the more expensive purchases that people make. There are many different vehicles available, each having slightly different features, and prospective purchasers have numerous factors to take into account. Convincing individuals to buy particular automobiles is thus a very expensive and difficult proposition. Understanding when and how purchasers select vehicles for purchase and their loyalty and purchase migration patterns, trends, and behavior can help define marketing strategies and direct limited marketing funds to areas most likely to provide a return on investment.

Manufacturers and dealerships have a difficult job not only in capturing new customers, but in maintaining older customers for repeat business. Information relating to various indications of purchaser loyalty, such as brand or manufacturer loyalty, is thus helpful in deciding when, where, and how marketing dollars should be spent to improve loyalty strategies and campaigns, as well as in identifying which customers or potential customers should be targeted. Such information can also help in a variety of other ways, such as in evaluating how or why sales were lost, for example. To date, customer loyalty evaluation solutions have been imperfect, only providing information related to garaged vehicles present during the same time window of study as the purchased vehicle and forcing one-to-one purchase correlations to owned/garaged vehicles that do not reflect the complexity of most vehicle purchase decisions. With more and more households owning more than one vehicle at a time, and often purchasing and discarding vehicles within limited time frames, it is useful to capture the greater complexities of vehicle purchasing.

SUMMARY

This disclosure provides systems and methods for evaluating the vehicle loyalty of various households or individuals. A household or individual may own one or more vehicles at a time. All cars that are owned at a given time are referred to generally as "garaged vehicles". Vehicles that are sold, returned from lease, or otherwise discarded are generally referenced as "disposed vehicles." Various embodiments of the systems and methods of this disclosure correlate new vehicle purchases attributable to an individual or household with the garaged and/or disposed vehicles of that household in a given time frame. These correlated records can then be used to provide insight into brand loyalty, manufacturer loyalty, and the like. Importantly prior syndicated reports have not analyzed disposal loyalty, which can be a key indicator of overall purchaser loyalty.

An embodiment of the systems and methods disclosed herein can provide reporting and statistics generation for the full data set or for various geographic or demographic spaces, while keeping identifying data characteristics of individuals and/or households private. This may be accomplished in some embodiments in manners designed to enable compliance with applicable privacy laws.

For purposes of summarizing this disclosure, certain aspects, advantages and novel features of the disclosure have been described herein. Of course, it is to be understood that not necessarily all such aspects, advantages or features will be included in any particular embodiment of the disclosure.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit its scope. Throughout the drawings, reference numbers are reused to indicate correspondence between referenced elements.

FIG. 3 illustrates an exemplary report.

FIG. 4 illustrates another exemplary report.

DETAILED DESCRIPTION

In one embodiment, a vehicle loyalty analysis system receives data from one or more databases that store vehicle information and processes the information to determine likelihood of consumer loyalty to a given brand, manufacturer, vehicle type, or the like. In an embodiment, the system can also analyze vehicle loyalty by model, domestic or import vehicle, and/or consumer lifestyle, demographic, or geography attributes. In an embodiment, vehicle loyalty is determined at a household level, while other embodiments may be directed to an individual level. While some of this disclosure refers to the systems with respect to automobiles, it is understood that the same or similar systems could be configured to provide similar information for any type of vehicle, including motorcycles, bicycles, sailboats, power boats, ships, airplanes, jets, recreational vehicles, ATVs, and the like. In an embodiment, correlations across vehicle types are also determinable. Reports of the various loyalty options over geographic areas, through one or more demographic populations, and the like can then be generated to help vehicle dealerships, manufacturers, and the like plan and execute marketing strategies.

An illustrative example will provide useful context in understanding the systems and methods disclosed herein. In this example, records for one household may include the following:

On Mar. 30, 2009, the household disposed of a Toyota Tundra;

On Apr. 20, 2009, the household maintained a Honda Civic "in the garage;"

On Jun. 17, 2009, the household purchased a new Honda Accord; and

On Sep. 3, 2009, the household disposed of a Honda Accord.

Further, in the example, the time period being studied is the quarter from Apr. 1, 2009 to Jun. 30, 2009. In this case, there is one purchase, which is the Honda Accord on June 17. Utilizing a +/−45 day window, the Accord purchase will be matched with the Honda Civic. The record of the Civic being in the household's garage is both within the study quarter and within 45 days prior to the purchase. This correlation would yield a "garage" brand loyalty, and a manufacturer loyalty, but a model disloyalty. Next, although the Tundra is outside the study quarter, it is within the +/−45 day window, so it is also correlated with the Accord purchase. Because the Tundra and Accord share no attributes, however, this correlation would produce a brand disloyalty rating for brand, manufacturer, model, and vehicle segment/type (such as SUV, coupe, midsize sedan, truck, etc.).

This type of information for a specific household would allow a manufacturer to better understand that the household may have changing needs and should be marketed to accordingly. On a larger level, trends among many households in a given area can help dealerships or manufacturers understand vehicle purchasing trends, influence the types of advertisements that are created or displayed, and influence incentives offers, for example.

Various embodiments and examples of the systems and methods for monitoring a vehicle will now be described with reference to the drawings. Like numbers indicate corresponding parts among the drawings and the leading digit represents the figure in which such part was first shown.

System

Figure 1:
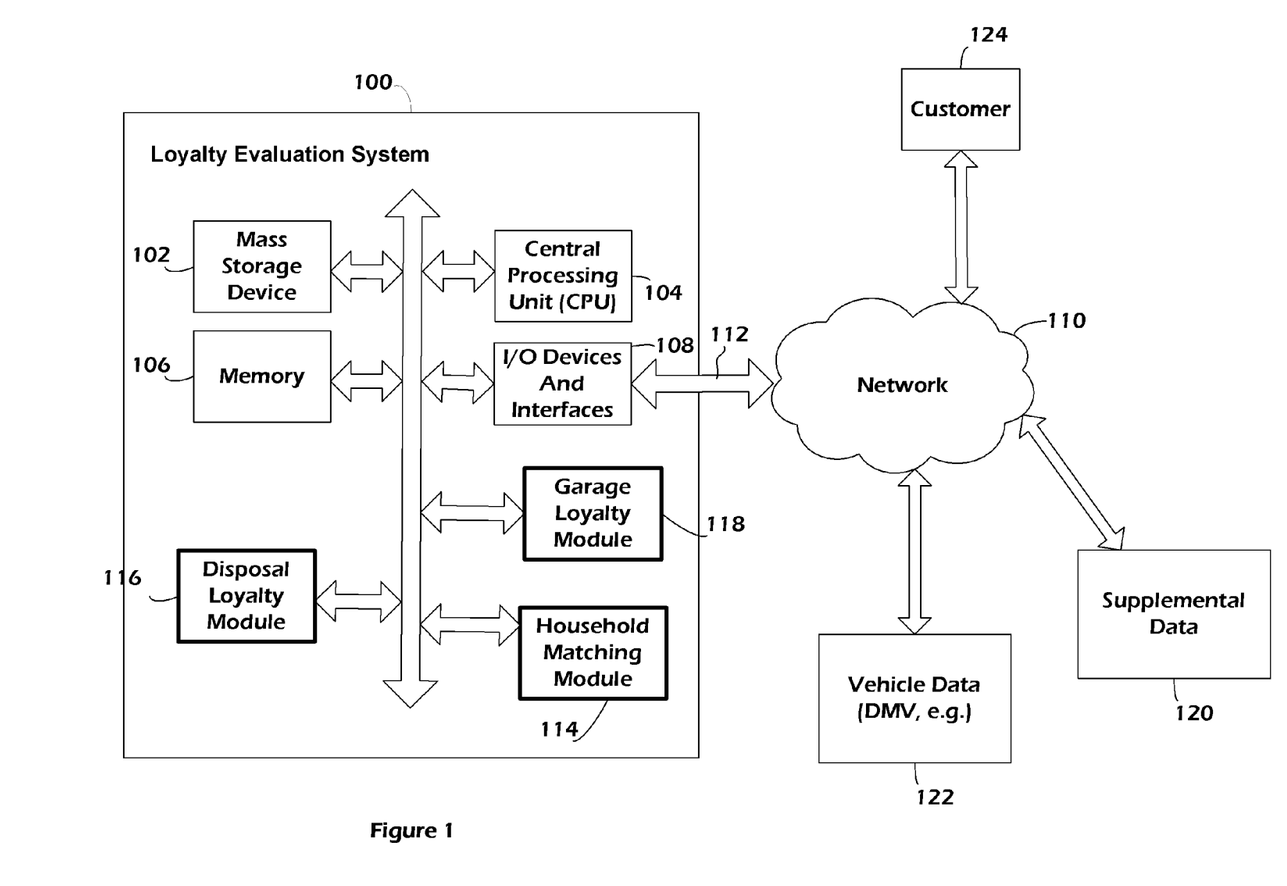
FIG. 1 illustrates a block diagram of an embodiment of a system for generating vehicle loyalty attributes.

FIG. 1 illustrates an embodiment of a computerized loyalty evaluation system 100 that includes one or more mass storage devices 102, one or more central processing units (CPUs) 104, memory 106, and one or more input/output devices and interfaces 108. In an embodiment, the loyalty evaluation system 100 communicates with a network 110, such as a Local Area Network (LAN), a Wide Area Network (WAN), or the like through a wired or wireless connection 112. Network 110 is the Internet in an embodiment. In an embodiment, a household matching module 114, a disposal loyalty module 116, and a garage loyalty module 118 are also included in loyalty evaluation system 100.

Loyalty evaluation system 100 communicates with one or more vehicle databases 122 through the network 110, in the illustrated embodiment. The one or more vehicle databases 122 generally include governmental motor vehicle records, for example Department of Motor Vehicle data from the various states and the District of Columbia. Similar data sources may be utilized from the governments of other countries in some embodiments. Vehicle information may also be obtained or derived from dealer records, independent agency records, insurance records, and the like. Vehicle information may be gathered from one or more of these databases or data sources into a primary vehicle database or it may be stored in separate databases. Data from these sources may be gathered periodically, such as weekly, monthly, quarterly, or the like and combined into a single database for future use. In an embodiment, vehicle data 122 may optionally be supplemented with additional data 120, such as demographic data, behavioral data, segment data (geodemographic segmentations that divide a population into lifestyle groups and clusters), or the like. In one embodiment, geodemographic segmentations may be created using variables such as: race and ethnic origin; age; family status; non-family household types, including college dormitories and military quarters; travel to work; education; employment by industry and occupation; income; forms of income; housing tenure; housing type; vehicle ownership; household size; age of dwelling and tenure.

Additionally, the loyalty evaluation system 100 can communicate with one or more customers 124 through the network 110. For example, in embodiments, a customer 124 may access the loyalty evaluation system 100 to view reports, modify reporting options, select data segments to include in a customer loyalty analysis, or the like.

As illustrated in FIG. 1, an embodiment of the disclosed system may obtain recent purchase and/or ownership data for a particular time period, such as, for example, the most recent business quarter. This data may be filtered to combine all purchase and ownership data for each household. In an embodiment, this may be accomplished with the aid of the household matching module 114. Disposal loyalty module 116 may then utilize this household information to correlate purchases with recent vehicle disposals within a pre-selected or user-chosen correlation window. For example, the disposal loyalty module 116 may determine whether a household is loyal in trading in a specific vehicle. For example, a household may own two vehicles: a Lexus SUV and an Audi A4. From this information alone, it would appear that the household is not brand loyal. However, if the Audi A4 is a recent purchase and the household also disposed of an Audi A6 recently, the household may actually be considered to be brand loyal.

In an embodiment, garage loyalty module 118 correlates purchases with past purchase data that does not have a corresponding disposal record until after the correlation window date and/or "in garage"-type records. "In garage"-type records may include DMV registration renewals, vehicle accident reports, vehicle maintenance reports, and the like that indicate a household is still in control of a given vehicle. Together these may be considered to be indicative of the vehicles that are owned by the household during the relevant time frame. The garage loyalty module 118 can then make determinations of loyalty for these correlating records as to manufacturer, brand, model, vehicle segment, and the like.

The output of the garage loyalty module 118 and disposal loyalty module 116 may be stored in a local or networked storage medium or database, such as the mass storage device 102. Customers 124 may access reports of the loyalty data through various means. In an example, a customer may download report data and utilize software with which to view the report, such as Tableau® Reader, report viewing and manipulation software available from Tableau Software. In other embodiments, report data may be available online, through a website, accessed via FTP, and the like.

The vehicle data may also be supplemented by geographic, demographic, and/or behavioral data from supplemental data 120, in an embodiment. This data may be used to help formulate more detailed reports. In an embodiment, data is anonymized so that vehicle ownership records are not compromised. In such an embodiment, loyalty statistics for certain demographic groups or geographical locations are reported.

System Information

The various features and functions described in this document may be embodied in software modules, hardware modules, combinations of the same, and the like executed by one or more general purpose computing devices or components, such as the CPU 104. The modules may be stored in any type of computer readable storage medium or device. The modules described herein may be combined, separated into one or more modules for sequential or parallel processing, and the like, in various embodiments.

Suitable hardware for a vehicle scoring system includes a conventional general purpose single-chip or multi-chip, single-core or multi-core microprocessor such as a Pentium® processor, a Pentium® II processor, a Pentium® Pro processor, an xx86 processor, an 8051 processor, a MIPS® processor, a Power PC® processor, or an ALPHA® processor. In addition, the microprocessor may be any conventional special purpose microprocessor such as a digital signal processor. Furthermore, the vehicle loyalty system 100 may be used in connection with various operating systems such as: Microsoft® Windows® 3.x, Microsoft® Windows 95, Microsoft® Windows 98, Microsoft® Windows NT, Microsoft® Windows XP, Microsoft® Windows CE, Palm Pilot OS, OS/2, Apple® MacOS®, Apple® OS X®, Disk Operating System (DOS), UNIX, Linux®, VxWorks, or IBM® OS/2®, Sun OS, Solaris OS, IRIX OS operating systems, and so forth. In an embodiment, an I/O device and interface 108 may be a network device and a network interface module to facilitate communication between it and disparate data sources 120, 122 and/or customer systems 124.

Method

Figure 2:
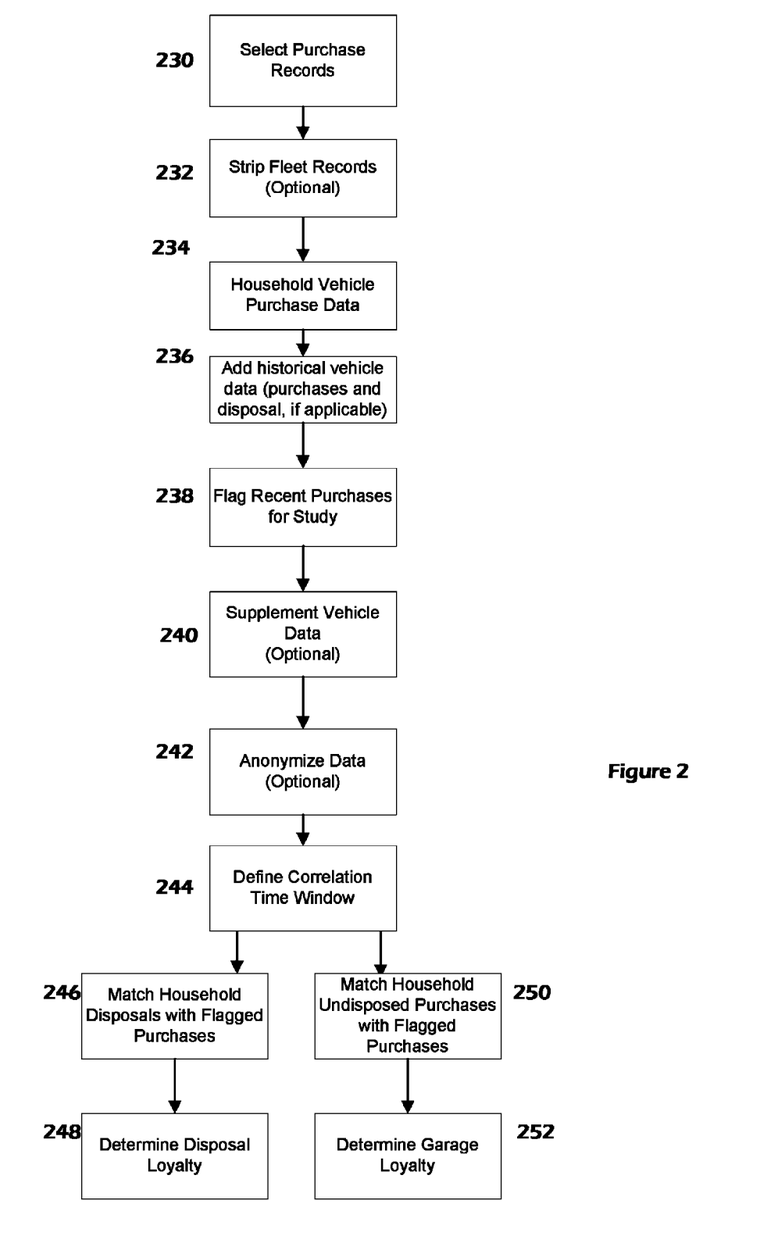
FIG. 2 illustrates a flow diagram of an embodiment of a vehicle loyalty determination method.

With an understanding of select embodiments of a vehicle loyalty system, embodiments of the methods used within these and other configured systems can now be described with reference to FIG. 2. FIG. 2 illustrates a flow diagram of one embodiment of the methods disclosed herein. Starting with block 230, purchase records for the appropriate time frame are selected. The time frame is the study period of interest. In many embodiments, this is the most recent complete quarter. It may also be a particular month, week, select number of months, quarter(s), time periods specified by date ranges, or the like. At block 232, the purchase records may strip fleet vehicle purchase records. Fleet vehicles may skew brand loyalty data because fleets generally include large numbers of particular brands incentivized by volume discounts. At block 234, the vehicle purchase data is sorted by household, in an embodiment. Other embodiments may be organized based on individuals, rather than households. Household matching module 114 of FIG. 1 may perform or aid in performing this task. In an embodiment, vehicle purchase records will be organized using surname and the most current registration or title address from the vehicle data records. Households with two or more new vehicle purchases will be combined into a single household record; they will be contained within that household's vehicle string.

At block 236, historical vehicle data, including purchases and disposals, is acquired. In an embodiment, each household record is appended with up to 10 historical garage vehicles (e.g. up to 10 of the most recent historical household vehicle purchases, including disposal dates if applicable). In an embodiment, the systems and methods may also sort garaged vehicles chronologically by most recent purchase date first, including the "initial" or subject vehicle record(s). In other embodiments, some other number of records up to all known records within the database may be appended to the household record.

At block 238, with the historical record augmentation a goal of the vehicle data, in an embodiment, the purchases made within the study window may be flagged for more easy recognition and processing. There may be more than one per household. At block 240, the vehicle purchase data may be supplemented with more complete vehicle and/or household data. This may include Manufacturer, Make, Model, Trim, Model Year, Style, Tire Size, Vehicle Weight, Wheel Base, Cylinders, Fuel type, Import/Domestic, Class Code, Purchase Date, Disposed Date, Registration Status Code, Purchase Code, Automotive News Vehicle, Disposed Date, and/or Automotive News Code. In one embodiment, the Automotive News Code represents the automotive news classification associated with the vehicle, as obtained by Automotive News, an industry standard source for automotive news and information. One embodiment of a set of Automotive News Codes is illustrated in Table 1 below.

TABLE 1

| Automotive News Code | Automotive News Classification |
|---|---|
| 0 | Unspecified |
| 1 | SUV - Entry Level |
| 2 | SUV - Lower Mid Range |
| 3 | SUV - Large |
| 4 | Pickup - Small |
| 5 | Pickup - Full Sized |
| 6 | Alt Power - Hybrid Truck |
| 7 | Van - Mini |
| 8 | Van - Full Sized |
| 9 | Small Car - Budget |
| 10 | Small Car - Economy |
| 11 | Mid Range Car - Lower |
| 12 | Mid Range Car - Standard |
| 13 | Mid Range Car - Premium |
| 14 | Upscale - Near Luxury |
| 15 | Upscale - Luxury |
| 16 | Sport Car - Touring |
| 17 | Sport Car - Premium |
| 18 | Alt Power - Hybrid Car |
| 19 | Sport Wagon - Entry Level |
| 20 | Sport Wagon - Premium |
| 21 | SUV - Premium |
| 22 | Traditional Car |
| 23 | Upscale - Premium |
| 24 | Sport Car - Ultra Luxury |
| 25 | Alt Power - Natural Gas |
| 26 | SUV - Pickup |
| 27 | SUV - Upper Mid Range |
| 28 | Sport Wagon - Mid Range |
| 29 | Upscale - Ultra |
| 30 | Sport Car - Upper Premium |

Household data may include, demographic data (such as, for example, age, income level, race, occupation, nationality, and the like), geographic data (typically generalized data, such as, county, state, or postal code), and/or behavioral data (such as geodemographic segmentation data). At block 242, this data is optionally anonymized—e.g., stripping names, specific addresses, and other potentially identifying information from the data—so that specific households and/or individuals cannot be identified in results.

At block 244, a correlation time window is determined. The correlation time window determines the time frame in which other vehicle records will be considered to be correlating records to a particular flagged purchase. Each of these correlations will be considered to determine an overall indication of vehicle loyalty, in an embodiment. In an embodiment, the time window is calculated using the individual vehicle purchase date, which may be inferred from registration data. In this manner, correlating purchases, garaged records, and/or disposal records may actually fall outside the study time frame but within the correlation time window. Incorporating these records will help provide a more accurate and realistic picture of loyalties.

Two separate paths are illustrated in FIG. 2. First, in block 246, the flagged purchase records are correlated to each disposal record that is within the time window selected or determined in block 244. These correlations will generally represent the vehicles that may have been discarded in favor of the flagged purchase. At block 248, disposal loyalty can then be tested with any correlations that were found. Each correlation can be tested for one or more of the following: manufacturer loyalty, brand loyalty, model loyalty, option loyalty, and the like. This testing may be as simple as checking for equivalence of the purchase records' fields, such as brand fields. Other loyalty indications may be derived indirectly from data that is available, such as by using look-up tables or translation tables to determine a loyalty indicator, for example, whether two vehicles are considered to be of the same vehicle type using data about the vehicle models.

Second, in block 250, the flagged purchase records are correlated to each purchase record that is within the time window selected or determined in block 244 and that does not have a matching disposal record prior to the date of the flagged purchase (indicating that the household likely still has that vehicle "in [its] garage"). In an embodiment, other records indicating current ownership may also be correlated apart from purchase records. At block 252, garage loyalty can then be tested with any correlations that were found. Each correlation can be tested for one or more of the following: manufacturer loyalty, brand loyalty, model loyalty, option loyalty, and the like.

In an embodiment, multiple correlation records within a given household can further be compared to determine an overall loyalty indication. For example, in an embodiment, there may be three correlated transactions and only one found to be "loyal." In an embodiment, any one loyalty finding may label the entire household as loyal for the tested transaction. In other embodiments, ranges of loyalty may also be determined, such as "disloyalty," "weak loyalty," "moderate loyalty," and "strong loyalty." Other embodiments may utilize a grading system or scale, such as a numbered scale of 1 to 10. This may be done for each flagged purchase record, for each household overall, and even for household groupings in various embodiments.

The data generated by the processes in blocks 248 and 252 can then be analyzed and reports can be calculated. In one embodiment, reports may be provided at the household level. A household may be counted multiple times—once for each garaged vehicle, and once for each new purchase within the studied time period. For example, Garage Loyalty reports may be based on what was owned at time of purchase. In some embodiments, Loyalty may refer to a determination of whether the purchase of another vehicle matches or does not match an owned or disposed vehicle. This information is estimated in an embodiment by including vehicles in the garage at time of purchase as well as disposal up to a specified time, such as, for example, 150 days prior to that particular vehicle's purchase date. Reports for Garage Loyalty may include: Garage Migration (Defection/Conquest calculated using garaged vehicles) and Garage Loyalty (Loyalty snapshot calculated using garaged vehicles). In some embodiments, Migration and Conquest may refer to a movement from one vehicle type to another. Disposal Loyalty reports may be based on what was disposed of at time of purchase. Reports for Disposal Loyalty may include Disposal Migration (Defection/Conquest calculated using disposed vehicles) and Disposal Loyalty (Loyalty snapshot calculated using disposed vehicles). Garage and Disposal Migration conquest and defection measurements are taken from the point of view of either the vehicle being disposed of and replaced (defection) or from the point of view of the replacement vehicle as to what it replaced (conquest). In some embodiments, Conquest reports may show for buyers of vehicles, what vehicle type was owned or disposed when purchasing the new vehicle. In some embodiments, Migration reports may show for owners/disposers of vehicles, the type of new vehicles purchased. FIGS. 3 and 4 illustrate exemplary reporting options.

Referring to FIG. 3, a report may indicate the brands of vehicles purchased by owners of vehicles of a given brand. For example, at 301, the report may indicate that of the 296,943 Ford owners returning to market, and as indicated at 302, the number of those owners that purchased another Ford is 135,511. In this example, as indicated at 303, brand loyalty would be calculated to be 135,511/296,943=45.64%. Such a report may also indicate loyalties by model for each brand.

Referring to FIG. 4, a report may indicate a comparison of brand loyalties for all brands. For example, as indicated at 401, the report may indicate that BMW owners are 30.02% loyal, while, as indicated at 402, GM owners are 31.76% loyal, and, as indicated at 403, Toyota owners are 43.59% loyal. Such a report may also indicate the loyalties by model for each brand.

In one embodiment, reports are generated in a format readable by Tableau™ (trademark owned by Tableau Software, Inc.). Excel worksheets, other general or special purpose graphing software, and the like are other potential report formatting options in other embodiments.

Garage Migration reports may show garage defection and conquest at the following levels:
1) Manufacturer
2) Brand
3) Model
4) Segment In one embodiment, the data presented in the Garage Migration reports may correlate what is present in the household garage when a new vehicle is purchased. In some embodiments, several types of Garage Migration reports may be available.

Some embodiments of the reports may show, for a given time period:
Brand and Model Outflow (what vehicles owners purchased when they returned to market, by brand and model);
Brand and Model Inflow (what vehicles buyers owned at the time of purchase, by brand and model);
Manufacturer and Brand Outflow (what vehicle owners purchased when they returned to market, by manufacturer and brand);
Manufacturer and Brand Outflow (what vehicle buyers owned at the time of purchase, by manufacturer and brand);
Segment Outflow (what vehicle owners purchased when they returned to market, by segment);
Segment Inflow (what vehicle buyers owned at time of purchase, by segment).

In one embodiment, a segment may be defined based on the automotive news classification of the vehicle.

Garage Loyalty reports may show a snapshot of loyalty, based on vehicle ownership, at the following levels:
1) Manufacturer
2) Brand
3) Model
4) Segment
5) Geography
6) Geodemographic Segmentation
7) Garage Composition In one embodiment, the data presented in the Garage Loyalty reports may show a snapshot in time of garage loyalty. Garage Loyalty may be a comparison of purchased vehicles to those currently owned or recently disposed. Garage Loyalty may track all vehicle purchase activity. In some embodiments, several types of Garage Loyalty reports may be available. In some embodiments, loyalty rates are calculated by dividing the number of vehicles that meet the specified loyalty criteria by the total number of purchased vehicles in that category. In other embodiments, loyalty rates are calculated by dividing the number of vehicles that meet the specified loyalty criteria by the total number of households.

Some embodiments of the reports may show:

Manufacturer Loyalty by Manufacturer, Brand and Purchase Type (repurchase loyalty to the manufacturer at the manufacturer, brand, and lease/purchase levels comparing two time periods);

Manufacturer Loyalty by Brand, Model and Purchase Type (repurchase loyalty to the manufacturer, at the manufacturer, brand, and lease/purchase levels comparing two time periods);

Manufacturer Loyalty by Manufacturer, Brand and Purchase Type (repurchase loyalty to the manufacturer, at the manufacturer, brand, and lease/purchase levels over a rolling time period);

Manufacturer Loyalty by Manufacturer, Brand and Purchase Type (repurchase loyalty to the manufacturer at the manufacturer, brand, and lease/purchase levels for a given time period);

Brand Loyalty by Manufacturer, Brand and Purchase Type (repurchase loyalty to the brand at the manufacturer, brand, and lease/purchase levels comparing two time periods);

Brand Loyalty by Brand, Model and Purchase Type (repurchase loyalty to the brand, at the brand, model, and lease/purchase levels comparing two time periods):

Brand Loyalty by Manufacturer, Brand and Purchase Type (repurchase loyalty to the brand at the manufacturer, brand, and lease/purchase levels over a rolling time period);

Brand Loyalty by Manufacturer, Brand and Purchase Type (repurchase loyalty to the brand at the manufacturer, brand, and lease/purchase levels for a given time period);

Manufacturer and Brand Loyalty by Segment (repurchase loyalty to the manufacturer and brand at the segment level for a given time period);

Manufacturer and Brand Loyalty by Geodemographic Segmentation (repurchase loyalty to the manufacturer and brand at the geodemographic segmentation level for a given time period);

Manufacturer and Brand Loyalty by Geography (repurchase loyalty to the manufacturer and brand at the geographic level for a given time period);

Manufacturer and Brand Loyalty by Garage Composition (repurchase loyalty to the manufacturer and brand based on current vehicle ownership for a given time period).

In some embodiments, geography may be based on Census regions and divisions. In some embodiments, garage composition may be based on origin of garage vehicles, such as domestic, European import, Asian import, other import, and the like.

Disposal Migration reports may show disposer loyalty at the following levels:
1) Manufacturer/Make
2) Make/Model
3) Segment
4) Body Style
5) Geography In one embodiment, the data presented in the Disposal Migration reports may show all vehicles disposed in the household within 150 days of a 'new' vehicle purchase. In some embodiments, several types of Disposal Migration reports may be available.

Some embodiments of the reports may show, for a given time period:

Brand and Model Outflow (what vehicle disposers purchased when they returned to market, by brand and model);

Brand and Model Inflow (what vehicles buyers disposed of at the time of purchase, by brand and model);

Manufacturer and Brand Outflow (what vehicle disposers purchased when they returned to market, by manufacturer and brand);

Manufacturer and Brand Outflow (what vehicle buyers disposed of at the time of purchase, by manufacturer and brand);

Segment Outflow (what vehicle disposers purchased when they returned to market, by segment);

Segment Inflow (what vehicle buyers disposed of at time of purchase, by segment).

In one embodiment, a segment may be defined based on the Automotive News classification of the vehicle.

Disposal Loyalty reports may show a snapshot of loyalty, based on vehicle disposed, at the following levels:
1) Manufacturer
2) Make/Model
3) Segment
4) Body Style
5) Geography
6) Geodemographic Segmentation
7) Garage Composition Disposal Loyalty may compare purchased vehicles to a recently disposed vehicle, where applicable. In some embodiments, Disposal Loyalty may track vehicle replacements, which may be a subset of all purchase activity. In one embodiment, the data presented in the Disposal Loyalty reports may show all vehicles disposed in the household within a specific time period before or after the 'new' vehicle purchase. In some embodiments, the time period may be 45, 60, 90, 120, or 150 days, for example. In some embodiments, several types of Disposal Loyalty reports may be available.

Some embodiments of the reports may show:

Manufacturer Loyalty by Manufacturer, Brand and Purchase Type (repurchase loyalty to the manufacturer at the manufacturer, brand, and lease/purchase levels comparing two time periods);

Manufacturer Loyalty by Brand, Model and Purchase Type (repurchase loyalty to the manufacturer, at the manufacturer, brand, and lease/purchase levels comparing two time periods);

Manufacturer Loyalty by Manufacturer, Brand and Purchase Type (repurchase loyalty to the manufacturer, at the manufacturer, brand, and lease/purchase levels over a rolling time period);

Manufacturer Loyalty by Manufacturer, Brand and Purchase Type (repurchase loyalty to the manufacturer at the manufacturer, brand, and lease/purchase levels for a given time period);

Brand Loyalty by Manufacturer, Brand and Purchase Type (repurchase loyalty to the brand at the manufacturer, brand, and lease/purchase levels comparing two time periods);

Brand Loyalty by Brand, Model and Purchase Type (repurchase loyalty to the brand, at the brand, model, and lease/purchase levels comparing two time periods):

Brand Loyalty by Manufacturer, Brand and Purchase Type (repurchase loyalty to the brand at the manufacturer, brand, and lease/purchase levels over a rolling time period);

Brand Loyalty by Manufacturer, Brand and Purchase Type (repurchase loyalty to the brand at the manufacturer, brand, and lease/purchase levels for a given time period);

Manufacturer and Brand Loyalty by Segment (repurchase loyalty to the manufacturer and brand at the segment level for a given time period);

Manufacturer and Brand Loyalty by Geodemographic Segmentation (repurchase loyalty to the manufacturer and brand at the geodemographic segmentation level for a given time period);

Manufacturer and Brand Loyalty by Geography (repurchase loyalty to the manufacturer and brand at the geographic level for a given time period);

Manufacturer and Brand Loyalty by Garage Composition (repurchase loyalty to the manufacturer and brand based on current vehicle ownership for a given time period).

Reports may be viewed at a macro level of data (for example, viewing results for all U.S. households), and criteria may be selected to result in more detailed views (for example, by state, by geographically defined location, by specific market, and the like). The charts, graphs and reports created through criteria selection may be saved.

In some embodiments, Garage Migration reports may have the following criteria selectable for detailed views:

For Garage Migration:
For level of vehicle owned, one, some or all of the following: Manufacturer, Brand, Model, Segment
For level of vehicle purchased, one, some or all of the following: Manufacturer, Brand, Model, Segment
View by Inflow or Outflow
Time period: Current quarter, Prior quarter, Same quarter, prior year, 13 month rolling, Previous 12 month total For Garage Loyalty:
For level of vehicle owned, one, some or all of the following: Manufacturer, Brand, Model, Segment,
For level of vehicle purchased, one, some or all of the following: Manufacturer, Brand, Model, Segment, Purchase Type (Retail, Lease, and/or Total)
Time period: Current quarter; Prior quarter; Same quarter, prior year; 13 month rolling; Previous 12 month total
For owners of vehicles: Client-specific geography, Geodemographic segmentation category, Garage composition For Disposal Migration:
For level of vehicle disposed, one, some or all of the following: Manufacturer, Brand, Model, Segment
For level of vehicle purchased, one, some or all of the following: Manufacturer, Brand, Model, Segment
View by Inflow or Outflow
Time period: Current quarter; Prior quarter; Same quarter, prior year; 13 month rolling; Previous 12 month total For Disposal Loyalty:
For level of vehicle disposed, one, some or all of the following: Manufacturer, Brand, Model, Segment,
For level of vehicle purchased, one, some or all of the following: Manufacturer, Brand, Model, Segment, Purchase Type (Retail, Lease, and/or Total)
Time period: Current quarter; Prior quarter, same year; Same quarter, prior year; 13 month rolling; Previous 12 month total
For owners of vehicles: Client-specific geography; Geodemographic segmentation category; Garage composition FIG. 3 shows a portion of an embodiment of a Garage Migration report. This report illustrates for owners of specific brands, what brands were purchased during Q4 ($4^{th}$ quarter). For example, as indicated by the highlighted rows, the report shows that of all purchases by Ford owners (total of 296,943 Ford owners), there were 135,511 that purchased another Ford vehicle. As indicated in the report, this represents 45.64% of the purchases.

In some embodiments, the report can indicate a different percentage. For example, a filtered percentage may indicate the percentage of Ford owners that purchased another Ford, but excluding some manufacturers and/or brands of other purchased vehicles by the Ford owners.

FIG. 4 shows a portion of an embodiment of a Garage Loyalty report. This report illustrates brand loyalty across all brands. For example, as indicated by the highlighted row, the Ford brand loyalty rate is 45.64%.

As data from the vehicle data sources 122 may be delayed or incomplete, the following rules provide exemplary definitions in processing the data:

Vehicle purchase date may be defined as the vehicle title/registration date;

Disposal date may be defined as the most recent vehicle title/registration date of the same VIN to a different household;

Due to delays in state reporting, what was in the garage at the time of purchase may be approximated. Therefore, "garage" or "owned" may be defined as vehicles currently titled/registered to a household or disposed of up to a specific number of days (for example, 45, 60, 90, 120 or 150 days) prior to the 'new' vehicle purchase, title, and/or registration date; and A household is considered loyal if a new vehicle purchase matches a previous new vehicle purchase at the level being measured (e.g. same brand or model), and the vehicle it is matched to is currently owned or was disposed up to 45, 60, 90, 120 or 150 days prior to or after the 'new' vehicle purchase, title, and/or registration date.

Although the foregoing has been described in terms of certain preferred embodiments, other embodiments will be apparent to those of ordinary skill in the art from the disclosure herein. For example, numerous other system configurations are possible. Disposal loyalty module 116 and garage loyalty module 118 may be combined in an embodiment. Data sources, such as vehicle data 122, may be stored locally, rather than accessed through a network. These are meant as examples only. Other embodiments will be understood by those of skill in the art. Many of the steps of the method described can be accomplished in other orders, and some may or may not be included in each embodiment. Additionally, fleet vehicle record removal is mentioned above, but other data optimization steps can also be included. For example, specific geographic limitations may be imposed and/or business purchase records may be removed to streamline processing and optimize overall processing requirements.

The present systems and methods may also be accessed by any of a number of means, such as through the Internet as already explained, through computer to computer transfer, through interactive television services, stand-alone or networked kiosks, automated telephone services and the like. Moreover, the described embodiments have been presented by way of example only, and are not intended to limit the scope of the disclosure. Indeed, the novel systems and methods described herein may be embodied in a variety of other forms without departing from the spirit thereof. Accordingly, other combinations, omissions, substitutions, and modifications will be apparent to the skilled artisan in view of the disclosure herein. Thus, the present disclosure is not limited by the preferred embodiments, but is defined by reference to the appended claims. The accompanying claims and their equivalents are intended to cover forms or modifications as would fall within the scope and spirit of the disclosure.

The invention claimed is:

1. A non-transitory computer readable medium whose contents include computer-executable instructions which direct a vehicle loyalty evaluation system to:
   select vehicle purchase records dated within an analysis time period;
   group related vehicle purchase records by household;
   add related historical vehicle purchase records and historical vehicle disposal records to grouped vehicle purchase records;
   define at least one correlation window; and
   analyze selected vehicle purchase records with at least some of the related historical vehicle records within the correlation window to determine a household loyalty, wherein at least some of the related historical vehicle records fall within the correlation window but outside the analysis time period,
   wherein the household loyalty comprises a garage loyalty, a disposal loyalty, a garage migration metric and a disposal migration metric for a given household,
   wherein the garage loyalty metric is an indicator of consistency between at least one of a vehicle manufacturer, make and model associated with at least one vehicle purchase record for the given household, and a vehicle manufacturer, make or model associated with at least one historical purchase record for the given household,
   wherein the disposal loyalty metric is an indicator of consistency between at least one of a vehicle manufacturer, make and model associated with at least one vehicle purchase record for the given household, and the vehicle manufacturer, make or model associated with at least one historical vehicle disposal record for the given household,
   wherein the garage migration metric is an indication of the vehicle manufacturer, make, model and segment associated with at least one vehicle purchase record for the given household, in relation to the vehicle manufacturer, make, model or segment associated with at least one historical vehicle purchase record for the given household, and
   wherein the disposal migration metric is an indication of the vehicle manufacturer, make, model and segment associated with at least one vehicle purchase record for the given household, in relation to the vehicle manufacturer, make, model or segment associated with at least one historical vehicle disposal record for the given household.

2. The non-transitory computer readable medium of claim 1, wherein the correlation window includes a time period with respect to at least one selected vehicle purchase record.

3. The non-transitory computer readable medium of claim 2, wherein the correlation window includes a time period of between 1 and 150 days before and between 1 and 150 days after the date of at least one selected vehicle purchase record.

4. The non-transitory computer readable medium of claim 1, wherein the computer-executable instructions further direct the system to supplement the vehicle purchase records with related information.

5. The non-transitory computer readable medium of claim 4, wherein related information comprises at least one of customer demographic, geographic, and behavioral data.

6. The non-transitory computer readable medium of claim 5, wherein the computer-executable instructions further direct the system to strip household identifying data from the records.

7. A computer-implemented vehicle loyalty evaluation system comprising:
   a processor that supports operation of a software application;
   a repository of vehicle data comprising a plurality of data items regarding vehicle purchases and a plurality of data items regarding vehicle disposals within an analysis time period, wherein the repository is accessible by the processor;
   a household matching module configured to match at least one of the plurality of data items regarding vehicle purchases and at least one of the plurality of data items regarding vehicle disposals to one of the plurality of households, wherein the household matching module is executed on the computer system;
   a repository of vehicle data comprising a plurality of historical data items regarding vehicle purchases and vehicle disposals associated with at least one of the plurality of households, wherein the repository is accessible by the computer system; and
   a loyalty module programmed to analyze, for at least one household, the matched plurality of data items regarding vehicle purchases, the matched plurality of data items regarding vehicle disposals and the plurality of historical data items, within at least one correlation time window, to determine a garage loyalty, a disposal loyalty, a garage migration and a disposal migration metric, wherein at least some of the historical data items fall within the correlation window but outside the analysis time period, wherein the loyalty module is executed on the computer system,
   wherein the garage loyalty metric for a given household is an indicator of consistency between at least one of a vehicle manufacturer, make and model associated with at least one data item regarding a vehicle purchase for the given household, and a vehicle manufacturer, make or model associated with at least one historical data item regarding a vehicle purchase for the given household,
   wherein the disposal loyalty metric is an indicator of consistency between at least one of a vehicle manufacturer, make and model associated with at least one data item regarding a vehicle purchase for the given household, and a vehicle manufacturer, make or model associated with at least one historical data item regarding a vehicle disposal for the given household,
   wherein the garage migration metric is an indication of a vehicle manufacturer, make, model and segment associated with at least one data item regarding a vehicle purchase for the given household, in relation to a vehicle manufacturer, make, model or segment associated with at least one historical data item regarding a vehicle purchase for the given household,
   wherein the disposal migration metric is an indication of a vehicle manufacturer, make, model and segment associated with at least one data item regarding a vehicle purchase for the given household, in relation to a vehicle manufacturer, make, model or segment associated with at least one historical data item regarding a vehicle disposal for the given household.

8. The system of claim 7, further comprising a repository of supplemental data comprising a plurality of geodemographic data items regarding the plurality of households.

9. The system of claim 8, wherein the plurality of geodemographic data items comprise items related to at least one of the following: race and ethnic origin; age; family status; non-family household types; travel to work; education; employment by industry and occupation; income; forms of income; housing tenure; housing type; vehicle ownership; household size; age of dwelling and tenure.

10. The system of claim 7, wherein the vehicle's segment comprises one of: SUV, Pickup, Van, Small Car, Mid Range, Upscale, Sport Car, Alternative Power, Sport Wagon, Traditional, Sport Wagon.

\* \* \* \* \*